United States Patent [19]

Senjo et al.

[11] 4,315,872
[45] Feb. 16, 1982

[54] PLATE COLUMN

[75] Inventors: Teizo Senjo, Machida; Makio Kobayashi, Toyonaka, both of Japan

[73] Assignees: Fuji Kasui Engineering Co., Ltd., Tokyo; Sumitomo Metal Industries, Ltd., Osaka, both of Japan

[21] Appl. No.: 141,982

[22] Filed: Apr. 21, 1980

Related U.S. Application Data

[63] Continuation of Ser. No. 878, Jan. 4, 1979, abandoned.

[30] Foreign Application Priority Data

Jul. 29, 1977 [JP] Japan .................................. 52-90411
Mar. 3, 1978 [JP] Japan .................................. 53-26321
Jul. 28, 1978 [JP] Japan .................................. 53-103091

[51] Int. Cl.³ ............................................. B01D 47/06
[52] U.S. Cl. .................................. 261/113; 261/114 JP; 55/94; 55/95
[58] Field of Search ............... 261/113, 114 R, 114 JP; 55/240, 233, 73, 94, 95; 423/242 A, 242 R

[56] References Cited

U.S. PATENT DOCUMENTS

| 1,749,266 | 3/1930 | Sontag | 261/113 |
| 2,201,502 | 5/1940 | Pyle | 261/113 |
| 2,750,173 | 6/1956 | Hartmann et al. | 261/113 |
| 3,480,407 | 11/1969 | Wentworth et al. | 261/113 |
| 3,489,506 | 1/1970 | Galstaun et al. | 261/113 |
| 3,892,837 | 7/1975 | Uchiyama et al. | 423/242 A |
| 3,941,572 | 3/1976 | Uchiyama et al. | 261/113 |

Primary Examiner—Gregory N. Clements
Attorney, Agent, or Firm—Armstrong, Nikaido, Marmelstein & Kubovcik

[57] ABSTRACT

Disclosed is an improved plate column suitable for use as a gas scrubber. This plate column comprises two or more sections and each section includes at least one preforated or grid plate without weir and downcomer and with a free-space ratio Fc of from 0.30 to 0.60 and includes a liquid feed distributor at the top portion thereof. The free-space ratio of the plate in each section increases from the uppermost section to the lowermost section. The liquid feed distributor except for the uppermost section is preferably provided with a number of nozzles in such a manner that liquid is sprayed within a central area of the plate which is about 10% to 50% of the total area of the plate.

3 Claims, 12 Drawing Figures

PLATE COLUMN

This is a continuation of application Ser. No. 000,878, filed Jan. 4, 1979, abandoned.

The present invention relates to a plate column and, more specifically, to an improved plate column suitable for use in the removal of a specific component such as sulfur oxides ($SO_x$), nitrogen oxides ($NO_x$), hydrogen chloride, hydrogen fluoride and dust particles from gases containing the same by countercurrently contacting the gas with a scrubbing liquid.

A gas-absorption and dust-removal process employing a plate column without weir and downcomer, i.e., a Moredana plate column, is already known. This process has recently become very well preferable for use because it has the following advantages: a uniform gas-liquid contact can be obtained even at a low liquid flow rate; a large-sized apparatus can be utilized; the pressure drop through a column is relatively low; and a gas-liquid system containing solid materials can be advantageously treated. (See U.S. Pat. No. 3,941,572).

However, problems exist in the use of the Moredana plate column (i.e., a perforated or grid plate column without weir and downcomer) in the case where a gas containing a relatively large amount of a component or components to be removed is treated. That is, when a liquid-gas ratio (L/G) is increased in order to increase the gas-liquid contact efficiency, the pressure drop through the column is unpreferably increased; the gas and/or dust removal efficiency is insufficient and a large amount of the scrubbing agent is consumed.

In the Moredana plate column, the upward flowing gas passes through some of the openings of the plate, whereas most of the downward flowing liquid passes through the other openings. The pattern of this distribution randomly changes with time. This self-sustaining waving motion on the plate is the characteristic feature of the operation of the Moredana plate column. However, in the conventional Moredana plate column, there are also problems in that, especially when a gas is treated in a column having a relatively large diameter (e.g., 5 m or more) under the conditions of a high superficial gas velocity (e.g., 5 m/sec or more) and a relatively high liquid rate (e.g., 200,000 kg/m².hr or more), only gas passes upwardly through the openings in the central portion of the plate, whereas only liquid passes downwardly through the openings in the peripheral portion of the plate. Thus, the self-sustaining waving or undulating motion of the Moredana plate column as mentioned above cannot be maintained, and channeling of liquid and gas streams occurs in the column.

Accordingly, the objects of the present invention are to obviate the above-mentioned problems of the conventional plate column without weir and downcomer and to provide an improved plate column which is capable of effectively and efficiently treating a gas containing a relatively large amount of a specific component or components to be treated, at a high liquid-gas ratio (L/G) without causing an unpreferable increase in the pressure drop through the column.

Another object of the present invention is to provide an improved plate column which is capable of effectively and efficiently treating a gas with a relatively large amount of liquid without causing any channeling of liquid and gas streams in the column.

A further object of the present invention is to provide a process for effectively, efficiently and economically removing a specific component from a gas containing a relatively large amount of such component.

In accordance with the present invention, there is provided a plate column for countercurrently contacting an upward flowing gas with a downward flowing liquid comprising at least two sections, each section including at least one perforated or grid plate without weir and downcomer and with a free-space ratio of from 0.30 to 0.60 and including a liquid feed distributor at the top portion thereof, the free-space ratio of the plate in each section increasing from the uppermost section to the lowermost section.

According to the preferred embodiment of the present invention, the liquid feed distributor of each section except for the uppermost section is provided with a number of nozzles in such a manner that liquid is sprayed within a central area of the plate which is about 10% to 50% of the total area of the plate.

In accordance with the present invention, there is also provided a process for removing a specific component from a gas containing the same which comprises the steps of:

passing the gas upwardly, at a superficial gas velocity within a range of from 2 to 7 m/sec., through a scrubbing column comprising at least two sections, each section including at least one perforated or grid plate without weir and downcomer and with a free-space ratio of from 0.30 to 0.60 and including a liquid feed distributor at the top portion thereof, the free-space ratio of the plate in each section increasing from the uppermost section to the lowermost section, and simultaneously passing a scrubbing liquid downwardly through the column at a liquid to gas ratio (L/G) of from 1 to 50, the scrubbing liquid being fed through the liquid feed distributor mounted at the top portion of each section of the column.

The term "free-space ratio" as used herein is defined as the ratio of the total hole or slit area (m²) of a plate to the cross-sectional area (m²) of the column. The term "superficial gas velocity" as used herein is defined as the ratio of the actual gas flow rate (m³/sec) to the column cross-sectional area (m²). The unit of the superficial gas velocity is m/sec.

The present invention will be illustrated in detail with reference to the accompanying drawings. However, it should be noted that the present invention is not intended to be limited by these drawings.

Figure 1:
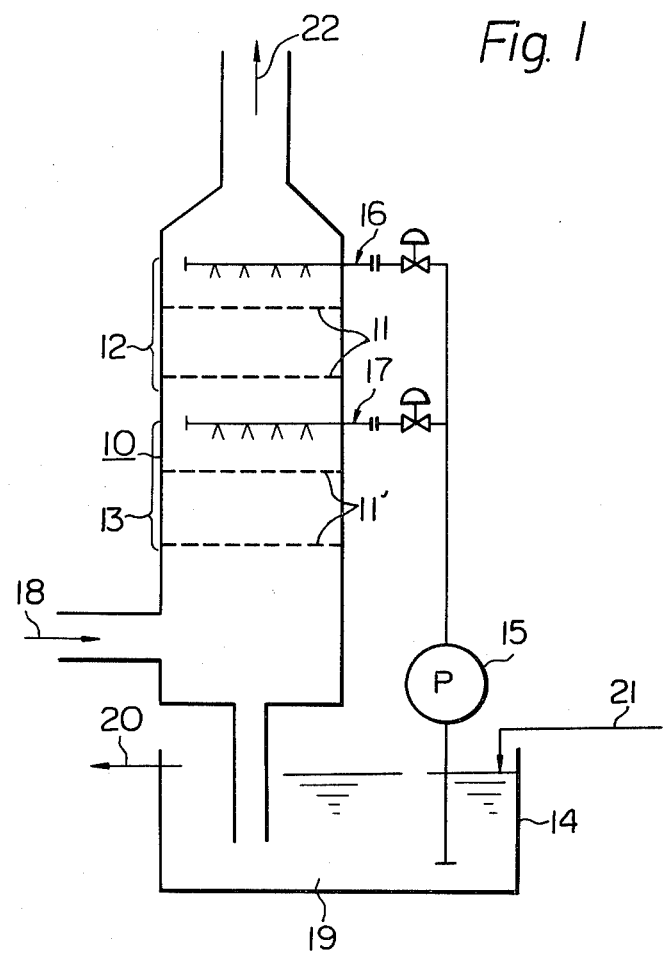
FIG. 1 is a schematic sectional view showing the structure of one embodiment of the plate column of the present invention.

The plate column of the present invention comprises two or more sections. Each section contains one or more perforated or grid plate having neither weir nor downcomer, and each section also has a liquid feed distributor at the top portion thereof. The free-space ratio Fc of the plate in each section can be selected from the range of from 0.30 to 0.60, provided that the free-space ratio Fc of the plate in each section increases from the uppermost section to the lowermost section. The free-space ratio Fc of the plate in the uppermost section should preferably be within the range of from 0.30 to 0.40, and that of the plate in the lowermost section should preferably be within the range of from 0.40 to 0.60. The free-space ratio Fc of the intermediate plate or plates, if any, can be selected from the range of between the free-space ratio of the plates of the uppermost section and the free-space ratio of the plate of the lowermost section. The free-space ratios Fc of the plates within the same section can be the same as or different from each other. For example, in the case where the plate column of the present invention contains three sections, the free-space ratios of the plates of the first, second and third sections can be preferably selected from the range of (i) 0.30 to 0.40, (ii) 0.35 to 0.55 and (iii) 0.40 to 0.60, respectively, provided that the selected free-space ratios of the plates increase from the uppermost section to the lowermost section.

In the case where the free-space ratio of the plate used in the present invention is less than 0.30, the superficial gas velocity in the column is unpreferably limited to less than 3 m/sec because the pressure drop of gas throughout the plate becomes high; whereas if the free-space ratio of the plate is more than 0.60, the plate efficiency is unpreferably decreased due to the reduction of the amount of the liquid hold-up on the plate. On the other hand, in the case where the free-space ratio Fc of the plate in the uppermost section is more than 0.40, an unpreferable amount of liquid must be fed to the uppermost section in order to maintain the necessary liquid retention on the plate; whereas in the case where the free-space ratio of the plate in the lowermost section is less than 0.40, the pressure drop throughout the plate is, from an economical point of view, unpreferably increased in order to maintain the desired superficial gas velocity in the column. Although no particular dimension of the openings (i.e., hole or slit) in the plate is required, the hole diameter or slit width is generally selected from a range of from 6 to 35 mm and preferably from 8 to 30 mm. The diameter of the scrubbing column to be employed in the present invention is generally 300 mm or more and, more preferably, 500 mm or more. Furthermore, there is no critical upper limit to the diameter of the scrubbing column. In fact, a scrubbing column having a diameter of approximately 10.3 m has been satisfactorily utilized in a practical situation. The space (or distance) of the two adjacent plates in the column is preferably about 500 mm or more and, more preferably, about 500 mm to about 1200 mm.

FIG. 1 shows one embodiment of the plate column of the present invention wherein two sections are contained. As shown in FIG. 1, a plate column 10 contains two sections 12 and 13, and each of the two sections has two perforated (or grid) plates 11 and 11' without weir and downcomer. The free-space ratio Fc of the plate 11 of the first section 12 is less than that of the plate 11' of the second section 13. At the top portions of the sections 12 and 13, there are provided liquid feed distributors 16 and 17, respectively. Thus, a liquid 19 (e.g., a scrubbing liquid) contained in a liquid circulation vessel 14 is pumped up from the vessel 14 by a pump 15 and separately fed to the top portions of the first and second sections 12 and 13 through the liquid feed distributors 16 and 17, respectively. The feed rates of the liquids which pass through the liquid feed distributors 16 and 17 can be arbitrarily controlled by means of, for example, any conventional automatic control valve.

A gas 18 which is to be treated in the column 10 is fed through a gas inlet at the bottom portion of the column 10 and passes upwardly through the plates 11' and 11, whereby the gas 18 is scrubbed with the downward flowing liquid 19. Thus, the gas 18 is first counter-currently contacted with a large amount of the scrubbing liquid 19 (i.e., the total amount of the liquid fed through both distributors 16 and 17) on the plate 11' of the second (or lower) section 13, the free-space ratio Fc of which plates is relatively large. The gas 18 is then countercurrently contacted with the scrubbing liquid fed through the distributor 16 on the plate 11 of the first (or upper) section 12, the free-space ratio Fc of the plate 11 being relatively small. Thus, in the first section 12, the gas, which is previously treated in the second section 13, is satisfactorily scrubbed with a scrubbing liquid fed through the distributor 16 at a relatively small liquid to gas ratio (L/G) on the plate 11 having a relatively small free-space ratio Fc. Accordingly, by using the improved plate column 10 of the present invention, a specific gas component or components or dust particles contained in the gas 18 can be effectively, efficiently and economically removed from the gas without causing an unpreferable increase in the pressure drop in the column.

The scrubbing liquid 19 enters into the vessel 14 after removing a specific gas component or components or dust particles from the gas. A portion 20 of the scrubbing liquid is discharged from the vessel 14 and the remainder thereof is circulated through the system after being mixed with a fresh scrubbing agent 21. The scrubbed gas 22 is discharged from the top of the column 10.

In the case where a specific gas component or components or dust particles contained in a gas are removed by using the improved plate column of the present invention, the following conditions can be preferably used. That is, the superficial gas velocity (i.e., gas feed rate (m³/sec)/cross-sectional area (m²) of the column) is generally within the range of from 2 to 7 m/sec and, more preferably, from 3 to 6 m/sec, in view of obtaining a stable continuous operation of the column. The liquid to gas flow ratio (L/G) is generally selected from the range of between 1 and 50 (kg scrubbing liquid/kg gas) and preferably between 2 and 40, in view of the pressure drop in the column and the gas removal or dust removal efficiency. Specifically, the liquid to gas flow ratio (L/G) in the uppermost section of the column is generally within the range of from 1 to 10 and, more preferably, from 2 to 7, and the L/G ratio in the lowermost section of the column is generally within the range of from 5 to 50 and, more preferably, from 10 to 40. For example, in the case where the present plate column having three sections is used, the following liquid to gas flow ratio (L/G) can be advantageously used.

| Section | L/G ratio |
| --- | --- |
| First (Uppermost) | 1–10 (preferably 2–7) |
| Second (Middle) | 3–30 (preferably 5–25) |
| Third (Lowermost) | 5–50 (preferably 10–40) |

According to the present invention, waste gases containing at least one harmful gas and/or solid component selected from the group consisting of sulfur oxides, nitrogen oxides hydrogen chloride, hydrogen fluoride and/or dust particles can be treated. Waste gases containing various odors or foul smelling components, as well as coke oven gases containing acidic components and/or ammonia gas, can also be treated according to the present invention. The present invention can be further applied to the case where other types of gas components and/or solid components contained in a gas must be removed.

The scrubbing or treating liquid to be used in the present invention can include any conventional scrubbing solutions or suspensions, any conventional absorbing solutions or suspensions and any aqueous solutions or emulsions. For instance, when a gas containing sulfur oxides and/or nitrogen oxides is treated, an aqueous solution or suspension containing, as an absorbing agent, the hydroxide of alkali metals, alkaline earth metals or ammonia such as sodium hydroxide, potassium hydroxide, calcium hydroxide, magnesium hydroxide or ammonium hydroxide; the carbonate of alkali metals, alkaline earth metals or ammonia such as sodium carbonate, potassium carbonate, calcium carbonate, magnesium carbonate or ammonium carbonate; the sulfite of alkali metals, alkaline earth metals or ammonia such as sodium sulfite, potassium sulfite, calcium sulfite, magnesium sulfite or ammonium sulfite; or the like, can be used as the scrubbing liquid. An aqueous ammonia solution can be used for removing acidic gas components such as hydrogen sulfide from, for example, a coke oven gas. In addition, in the case where ammonia contained in a gas is removed, an aqueous solution containing sulfuric acid, phosphoric acid, carboxylic acid, acetic acid, oxalic acid, ammonium hydrogen phosphate or the like can be used. When a gas containing solid particles such as fine dust or soot is treated, water or water containing any conventional surface active agent can be used for physically removing the solid particles. When the solid particles are removed from a gas simultaneously with, for example, sulfur oxides and/or nitrogen oxides, the above-mentioned scrubbing or absorbing liquid for removing sulfur oxides and/or nitrogen oxides can also act as a scrubbing liquid for the solid particles.

Figure 2:
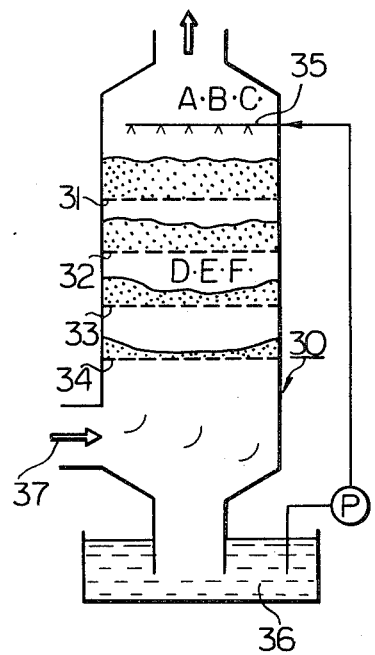
FIG. 2 is a schematic sectional view illustrating a typical gas-liquid contact condition on the plates of the conventional Moredana plate column.

As mentioned hereinbefore, the conventional Moredana plate column has the characteristic feature in that the self-sustaining waving motion occurs violently on the plates. However, as schematically shown in FIG. 2, since the conventional Moredana plate column 30 has only one liquid feed distributor 35 at the top portion thereof, the liquid 36 uniformly sprayed over the first (uppermost) plate 31 gradually shifts toward the peripheral portion of the subsequent plates 32, 33 and 34 as the liquid flows downwardly through the column 30. Thus, in the lowermost plate 34, a gas 37 passes substantially through the openings in the central portion of the plate, whereas the liquid flows substantially down through the openings in the peripheral portion of the plate; therefore, the close gas-liquid contact on the plate is not effected. This phenomenon becomes more remarkable as the number of the plates is increased.

Contrary to this, in the plate column of the present invention, which comprises at least two sections, each having a liquid feed distributor at the top portion thereof, such phenomenon can be suppressed. However, especially when a gas is treated in a column having a relatively large diameter (e.g., 5 m or more) under the conditions of a high superficial gas velocity (e.g., 5 m/sec or more a relatively high liquid rate (e.g., 200,000 kg/m².hr or more), there are still minor problems in the plate column of the first embodiment of the present invention, which comprises at least two sections, each section including at least one perforated or grid plate without weir and downcomer and with a free-space ratio of from 0.30 to 0.60 and including a liquid feed distributor at the top portion thereof, i.e., the complete gas-liquid contact efficiency cannot be effected and the channeling of liquid and gas streams in the column still occurs.

Figure 3:
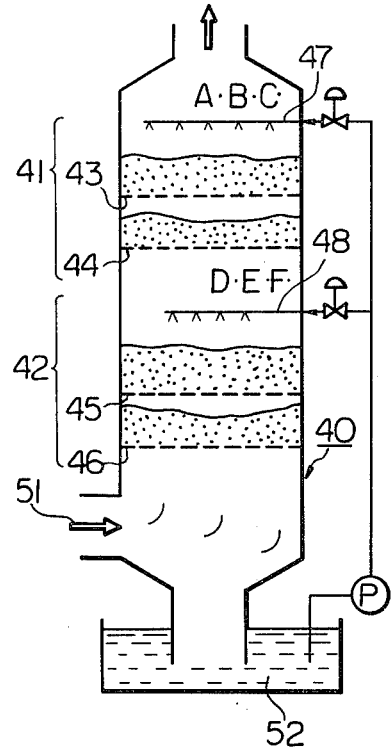
FIG. 3 is a schematic sectional view illustrating a typical gas-liquid contact condition on the plates of the present Moredana plate column.
Figure 4:
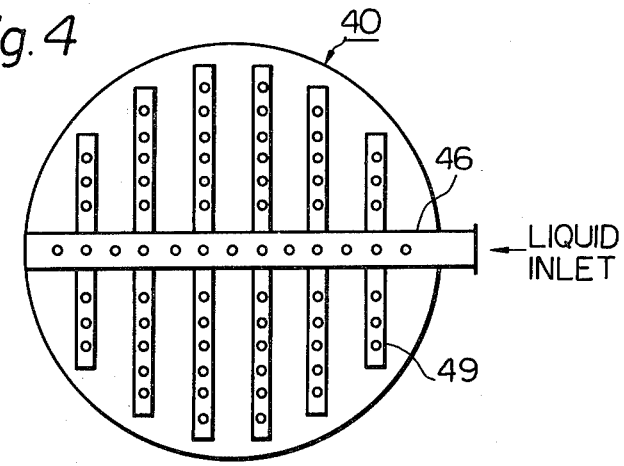
FIG. 4 is a plan view showing an example of the liquid feed distributor mounted on the top portion of the uppermost section of the present Moredana plate column.
Figure 5:
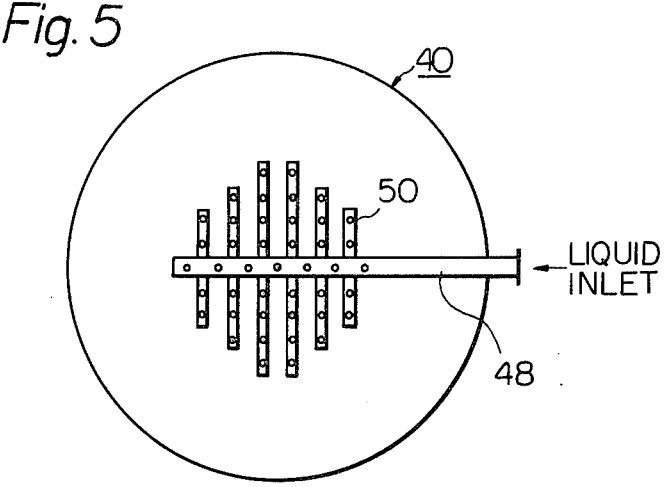
FIGS. 5 and 6 are plan views showing two typical examples of the liquid feed distributor mounted on the top portion of each section (except for the uppermost section) of the preferred embodiment of the present Moredana plate column.
Figure 6:
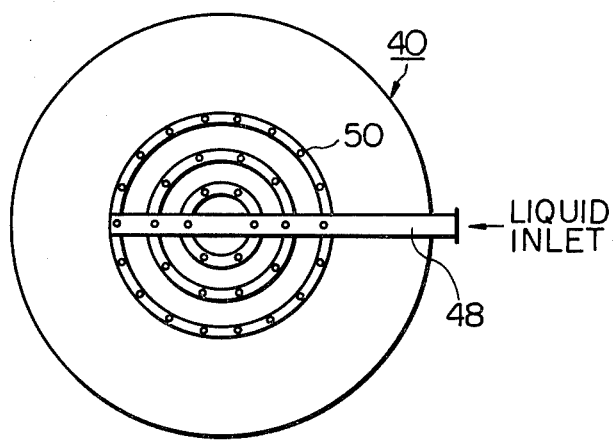

It has now been found that, when the liquid feed distributor of each section of the present plate column except for the uppermost section is provided with a number of nozzles in such a manner that liquid is sprayed within a central area of the plate which is about 10% to about 50% of the total area of the plate, the above-mentioned problems can be effectively solved. For example, as shown in FIG. 3, a plate column 40 according to the preferred embodiment of the present invention has two sections 41 and 42, each having two perforated plates and a liquid feed distributor at the top thereof. Thus, the first section 41 has two perforated plates 43 and 44, and has, at the top thereof, a liquid feed distributor 47 which is provided with a number of nozzles 49 (see FIG. 4) in such a manner that liquid is uniformly sprayed over the entire surface of the plate 43. The second section 42 has two perforated plates 45 and 46, and has a liquid feed distributor 48 at the top portion thereof. The liquid feed distributor 48 is provided with a number of nozzles 50 in such a manner that liquid is sprayed within a central area of the plate which is about 10 to 50% of the total area of the plate (see FIGS. 5 and 6 which show typical examples of the nozzle arrangement of the distributor 48). According to the preferred embodiment of the present invention, as shown in FIG. 3, since the liquid is separately fed through the distributors 47 and 48 and since the free-space ratios of the plates 43 and 44 are less than those of the plates 45 and 46, respectively, a gas containing a relatively large amount of a specific component or components to be treated can be effectively and efficiently scrubbed with a scrubbing liquid without causing any unpreferable increase in the pressure drop in the column. In addition, according to the preferred embodiment of the present invention, the self-sustaining waving motion, which is the characteristic feature of the Moredana plate column, is satisfactorily observed on each plate without causing any channeling of liquid and gas streams in the column as schematically shown in FIG. 3. Thus, a gas 51 fed through a gas inlet of the column 40 is first uniformly and countercurrently contacted with the total amount of scrubbing liquid 52 fed through the distributors 47 and 48 on the plates 45 and 46 having a relatively large free-space ratio at a relatively large liquid to gas ratio (L/G). The gas is then uniformly and countercurrently contacted with the scrubbing liquid 52 fed through the distributor 47 on the plates 43 and 44 having a relatively small free-space ratio at a relatively small liquid to gas ratio (L/G).

According to the further embodiment of the present invention, the perforated plates located in the plate column are supported with tray support beams which are fixed to a hollow or solid support post mounted in the center of the column.

Figure 7:
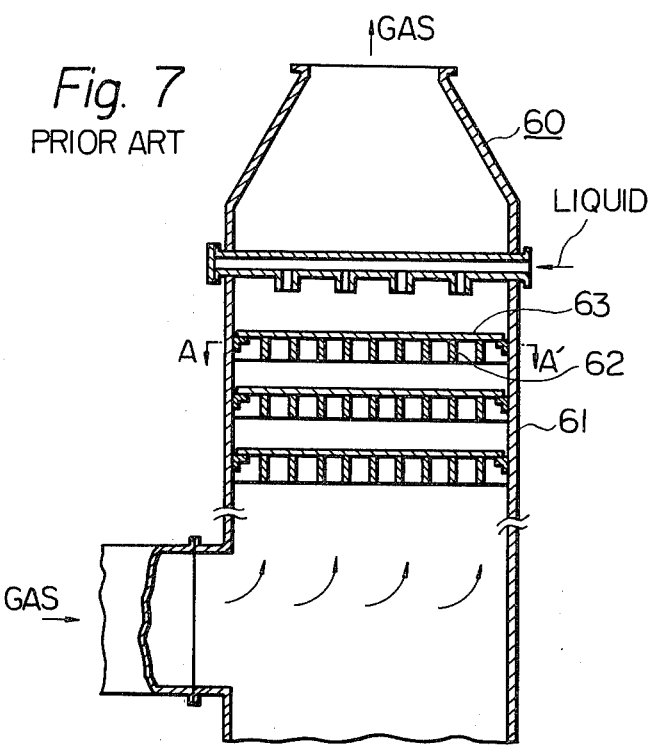
FIG. 7 is a schematic sectional view illustrating the structure of conventional typical tray support beams of the column.
Figure 8:
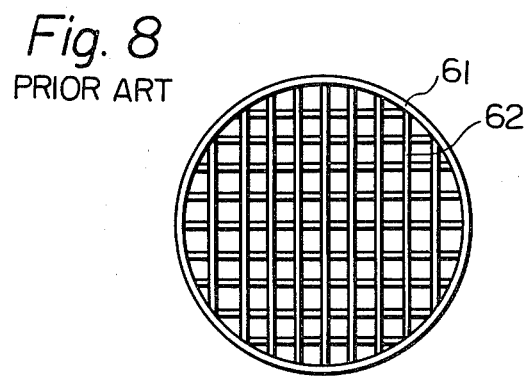
FIG. 8 is a section taken along the line A—A' in FIG. 7.

As shown in FIGS. 7 and 8, plates 63 in a conventional column 60 are usually supported with tray support beams 62 which are fixed to a peripheral portion 61 of the column 60 by a suitable means. However, when a plate column having a relatively large diameter (e.g., 5 m or more) must be used in order to treat a large amount of a gas or liquid, then it is necessary to cause the structure of the tray support beams 62 to become dense as shown in FIG. 8. Therefore, there is a problem in that, since the cross-sectional area of the tray support beams 62 becomes fairly large, dead spaces which prevent a uniform gas-liquid contact on the plate 63 are formed. This also causes the channeling of liquid and gas streams to occur in the column.

Figure 9:
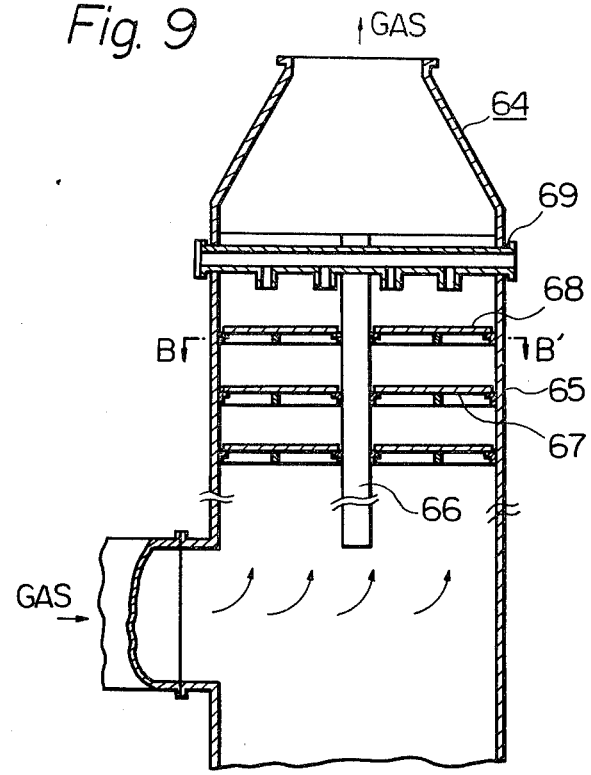
FIG. 9 is a schematic sectional view illustrating the structure of typical tray support beams which can be preferably used in the present plate column.
Figure 10:
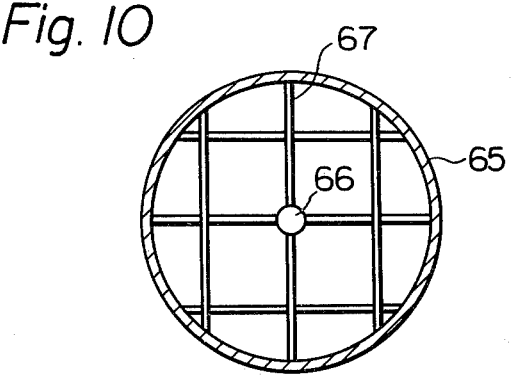
FIG. 10 is a sectional view taken along the line B—B' in FIG. 9.
Figure 11:
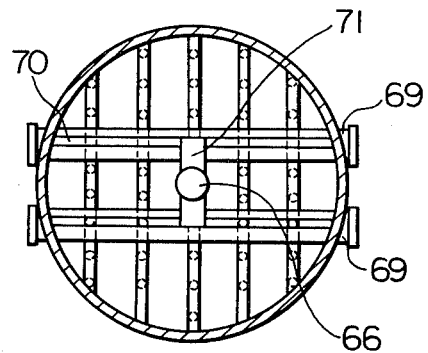
FIG. 11 is a plan view illustrating a mounting structure of the support post for the tray beams according to the preferred embodiment of the present invention.
Figure 12:
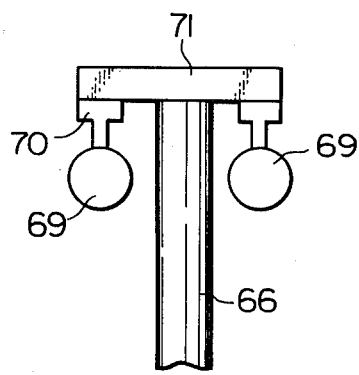
FIG. 12 is a schematic sectional view illustrating a mounting structure of the support post for the tray beams according to the preferred embodiment of the present invention.

However, in accordance with the further embodiment of the present invention, as shown in FIGS. 9 and 10, plates 68 in the present plate column 64 (only one section of the plate column is shown in FIG. 9) are supported with tray support beams 67 which are fixed to a hollow or solid support post 66 suspended in the center of the column 64 from the top portion of the column 64 and which are also fixed to a pheripheral portion 65. Since the support post 66 is used for supporting plates 68, the structure of the tray support beams 67 can be simple, as shown in FIG. 10, even when a plate column having a relatively large diameter must be used in order to treat a large amount of a gas or liquid. The support post 66 can be mounted in the center of the column 64 by any suitable means. For example, as shown in FIGS. 11 and 12, the support post 66 can be suspended from a beam 71 which is mounted on the liquid feed distributors 69 through a beam 70.

In the case where a plate column having a diameter of about 10 m and having six perforated plates without weir and downcomer is installed, eighteen tray support beams 62 each having a size of 320 mm×45 mm are required in the conventional plate supporting system, whereas only six tray support beams 67 each having a size of 330 mm×20 mm are required in the present plate supporting system, together with a hollow cylindrical post 66 having an outer diameter of 520 mm and a wall thickness of 10 mm. The cross-sectional area and the material weight of the tray support beams (containing that of the cylindrical post 66 in the latter case) are as follows.

|  | Conventional System (FIGS. 7 and 8) | Present System (FIGS. 9 and 10) |
| --- | --- | --- |
| Cross-sectional Area | 8.5 m² *1 | 3.8 m² |
| Material Weight | 59 t | 26 t |

*1 This corresponds to about 11% of the cross-sectional area of the column.

Thus, according to the further embodiment of the present invention, an effective gas-liquid contact on the plates can be achieved and no channeling of the gas and liquid streams will occur in the plate column.

As is clear from the above discussion, the following advantages can be provided according to the present invention.

(1) Gas can be treated at a high superficial gas velocity.

(2) Since the amount of the scrubbing liquid (kg/m².hr) in the column can be increased, a large amount of a specific component to be treated, which is contained in a gas, can be removed from the gas containing the same by using a single plate column. Thus, the gas removal capacity of the column is remarkably increased.

(3) Since the channeling of the gas and liquid streams (uniform gas-liquid contact) in the column can be effectively obviated, an improvement in the gas treating efficiency of the column, a stable column operation and low running (or operation) costs are achieved.

(4) Since the structure of the column is simple, there is no fear that plugging will occur due to the presence of solid particles.

(5) A substantially constant gas absorption or dust removal efficiency can be obtained together with a constant flow rate of the scrubbing liquid even when the gas feed rate is changed.

The present invention will be further illustrated by the following Examples. However, it should be noted that the present invention is by no means limited to such Examples.

EXAMPLE 1

Simulated gas containing 10 to 15% by volume of $O_2$, 6 to 10% by volume of $CO_2$, a specific amount of $SO_2$ as listed in Table 1, below, and the remainder being $N_2$ was continuously introduced into the bottom portion of a perforated plate column without weir and downcomer (i.e., a Moredana plate column) as shown in FIG. 1 and scrubbed with an aqueous suspension mainly containing $CaCO_3$ as a scrubbing agent. The general operating conditions are as follows.

Diameter of column: 500 mm
Distance between two adjacent plates: 1 m
Hole diameter of plate: 10 mm
Superficial gas velocity: 4 m/sec.
pH of scrubbing liquid at inlet of column: 6.0–6.2
pH of scrubbing liquid at outlet of column: 5.1–5.5

Thus, ten scrubbing runs, wherein the $SO_2$ content in the feed gas, the number of sections in the column, the free-space ratio Fc of the plate, the number of plates in each section, the liquid-gas ratio (L/G) and the $CaCO_3$ content in the scrubbing liquid were respectively changed as listed in Table 1, below, were carried out. The results of the ten runs are also shown in Table 1, below. The pressure drop (mmH₂O) in the column was manometrically measured. The contents of $SO_2$ in the inlet and outlet of the column were measured by using an ultraviolet spectro-photometer.

TABLE 1

| Run No. | Number of sections (−) | FC*[1] (−) | Number of plates*[1] | L/G (kg/kg) | CaCO$_3$ content (g/liter) | SO$_2$ content at inlet of column (ppm) | Pressure drop through column (mmH$_2$O) | SO$_2$ Removal efficiency (%) |
|---|---|---|---|---|---|---|---|---|
| 1*[3] | 1 | 0.42<br>0.32 | 4<br>2 | 11<br>4 | 8–10 | 3000 | 260 | 87–90 |
| 2*[2] | 2 | 0.42<br>0.32 | 2<br>2 | 11<br>4 | 8–10 | 3000 | 260 | 96–98 |
| 3*[2] | 2 | 0.42 | 2 | 11 | 3–5 | 3000 | 260 | 93–96 |
| 4*[3] | 1 | 0.45 | 4 | 14 | 8–10 | 3000 | 270 | 89–91 |
| 5*[3] | 1 | 0.38<br>0.38 | 4<br>2 | 11<br>4 | 8–10 | 3000 | 300 | 89–92 |
| 6*[2] | 2 | 0.50 | 2 | 11 | 8–10 | 3000 | 210 | 94–97 |
| 7*[3] | 1 | 0.50<br>0.38 | 6<br>2 | 15<br>4 | 8–10 | 8000 | 300 | 81–85 |
| 8*[2] | 3 | 0.50<br>0.55 | 2<br>2 | 11<br>15 | 8–10 | 8000 | 280 | 93–96 |
| 9*[3] | 1 | 0.55 | 6 | 25 | 8–10 | 12000 | 335 | 87–90 |
| 10*[2] | 3 | 0.38<br>0.50<br>0.60 | 2<br>2<br>2 | 5<br>15<br>25 | 8–10 | 12000 | 310 | 95–97 |

*[1]From the top of the column
*[2]Runs Nos. 2, 3, 6, 8 and 10: Example of the Present Invention
*[3]Runs Nos. 1, 4, 5, 7 and 9: Comparative Example The following summarizes the results of Runs Nos. 1 through 10.

(1) A high SO$_2$ removal efficiency can be obtained in accordance with the present invention in the case where the scrubbing operation is carried out under conditions wherein the L/G ratio, the CaCO$_3$ content and the pressure drop in the column are maintained same (See Runs Nos. 1 and 2 and Runs Nos. 7 and 8).

(2) Even when a low CaCO$_3$ content is used, the SO$_2$ removal efficiency of the present invention (Run No. 3) is still higher than that of the conventional process (Run No. 1). Thus, the present process is very economical.

(3) As is clear from the results of Runs Nos. 2 and 4, a high desulfurization efficiency can be obtained in accordance with the present invention, even when the liquid-gas ratio (L/g) is small. Thus, the pump capacity for circulating a scrubbing liquid through the system can be minimized.

(4) As is clear from Runs Nos. 5 and 6, a high desulfurization efficiency can be obtained in accordance with the present invention even when the desulfurization operation is controlled so as to decrease the pressure drop through the column.

In addition, when the above-mentioned examples were repeated, except that MgCO$_3$ was used in lieu of CaCO$_3$, similar results to those in the above-mentioned examples were obtained.

a diameter of about 6 m and provided with four perforated plates without weir and downcomer as shown in FIG. 3. The free space ratio of the two plates in the first section (i.e., the uppermost section) was 0.32 and that of the two plates in the second section was 0.45. The liquid feed distributor of the first section was provided with a number of nozzles in such a manner that liquid was uniformly sprayed over the entire surface of the plate, whereas the liquid feed distributor of the second section was provided with a number of nozzles in such a manner that liquid was sprayed within a central area of the plate which was about 25% of the total area of the plate. During a stable operation, gas samples were taken from points A, B, C, D, E and F, as shown in FIG. 3, inside the column, as well as from the gas outlet, and the SO$_2$ contents in the samples were measured. The results are shown in Table 2, below, (See Runs Nos. 1 and 2).

As a comparative Example, the above test was repeated except that a conventional perforated plate column having a diameter of about 6 m and provided with four perforated plates without weir and downcomer and with a free-space ratio of 0.35, as shown in FIG. 2, was used instead of the perforated plate column as used in Run Nos. 1 and 2. The results are also shown in Table 2, below, (See Runs Nos. 3 and 4).

As is clear from the results shown in Table 2, a remarkably uniform gas-liquid contact on the entire surface of the plate can be obtained according to the present invention (See Runs Nos. 1 and 2).

TABLE 2

| Run No. | SO$_2$ Content (input) (ppm) | L/G (kg/kg) First section | L/G (kg/kg) Second section | SO$_2$ Content distribution in column (ppm) A | B | C | D | E | F | SO$_2$ Content (output) (ppm) |
|---|---|---|---|---|---|---|---|---|---|---|
| 1 | 1500 | 5 | 10 | 14 | 15 | 16 | 220 | 210 | 205 | 20 |
| 2 | 1500 | 3.5 | 7 | 25 | 25 | 28 | 240 | 255 | 250 | 30 |
| 3* | 1500 | | 10 | 150 | 120 | 50 | 1350 | 800 | 450 | 150 |
| 4* | 1500 | | 7 | 250 | 220 | 110 | 1300 | 700 | 400 | 250 |

*Comparative Example

EXAMPLE 2

Waste gas containing 3% by volume of O$_2$, 11% by volume of CO$_2$ and about 1500 ppm (by volume) of SO$_2$ was treated by using a perforated plate column having

EXAMPLE 3

Flue gas containing approximately 2.0 g/Nm$^3$ of dust having a diameter of 0.05 to 5 microns was continuously introduced into the bottom portion of a Moredana scrubbing column having a diameter of 10.3 m and provided with four perforated plates without weir and downcomer, as shown in FIG. 3. The free-space ratio of the two plates in the first section was 0.32 and that of the two plates in the second section was 0.42.

Into the top portion of the first section the Moredana plate column, water was introduced at a rate of 60,000 kg/m$^2$.hr through the first liquid distributor which was provided with a number of nozzles in such a manner that liquid was uniformly sprayed over the entire surface of the plate. Also, into the top portion of the second section of the Moredana plate column, water was introduced at a rate of 90,000 kg/m$^2$.hr through the second liquid distributor which was provided with a number of nozzles in such a manner that liquid was sprayed within a central area of the plate which was about 40% of the total area of the plate. The superficial gas velocity in the column was 4 m/sec.

From the measurement of the dust content of the treated off-gas, the dust removal efficiency was determined to be 97.5%. The pressure drop of the column was 220 mmH$_2$O.

What we claim is:

1. A process for removing a specific component from a gas comprising the steps of:

passing said gas upwardly, at a superficial gas velocity within a range of 2 to 7 m/second, through a scrubbing column comprising at least two sections, each section including at least one perforated or grid plate without weir and downcomer having a free-space ratio of from 0.30 to 0.60, and a liquid feed distributor at a top portion thereof for increasing a liquid-to-gas ratio (L/G) at said column from an uppermost section to a lowermost section, said free-space ratio of said at least one plate in each section increasing from said uppermost section to said lowermost section whereby pressure drop across each section is kept uniform despite the increase in liquid-to-gas ratio (L/G), said plates being supported by means of tray support beams which are fixed to a support post suspended in a center of said column, and said liquid feed distributor of each section up to but not including said uppermost section, being provided with a plurality of nozzles in such a manner that liquid is sprayed within a central area of each plate, said central area comprising about 10 to 50% of the total area of each plate, said liquid feed distributor of said uppermost section being provided with a plurality of nozzles in such a manner that liquid is sprayed uniformly across the entire uppermost plate, whereby channeling across the plates in said column is substantially limited; and simultaneously passing a scrubbing liquid downwardly through said column at a liquid-to-gas ratio (L/G) of from 1 to 50, a portion of said scrubbing liquid being fed through the liquid feed distributor of said uppermost section and the remainder of said scrubbing liquid being fed through the others of said distributors mounted at said top portions of said sections of said column, wherein the gas in the lowermost portion is uniformly and countercurrently scrubbed with the total amount of scrubbing liquid and the gas in the uppermost section is uniformly and countercurrently scrubbed with only said portion the scrubbing liquid fed through the liquid feed distributor of the uppermost section whereby improved removal results.

2. A process for removing a specific component from a gas as in claim 1, wherein:

said free-space ratio of said plate of said uppermost section is within the range of from 0.30 to 0.40; and
said free-space ratio of said plate of said lowermost section is within the range of from 0.40 to 0.60.

3. A process for removing a specific component from a gas, as in claim 1, wherein:

said gas is a waste gas containing sulfur oxides; and
said liquid is selected from the group consisting of an aqueous solution or a suspension, said liquid containing at least one absorbing agent selected from the group consisting of sodium hydroxide, sodium carbonate, potassium hydroxide, potassium carbonate, magnesium hydroxide, magnesium carbonate, calcium hydroxide, calcium carbonate, ammonium hydroxide and ammonium carbonate.

* * * * *